2,944,937

PHOSPHORAMIDATES

Clarence L. Moyle, Clare, Mich., and Lisby L. Wade, Lake Jackson, Tex., assignors to The Dow Chemical Company, Midland, Mich., a corporation of Delaware No Drawing. Filed July 22, 1958, Ser. No. 750,102

9 Claims. (Cl. 167—53)

This invention is directed to phosphoramidates having the formula

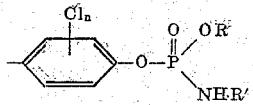

In this and succeeding formulae, R represents a lower alkyl radical containing from 1 to 4 carbon atoms, inclusive, R' is selected from the group consisting of hydrogen and a lower alkyl radical containing from 1 to 4 carbon atoms, inclusive, and $n$ is an integer of from 1 to 5, inclusive. The invention also relates to methods and compositions for controlling parasites attacking warm-blooded animals.

Domestic animals are subject to attack by a number of different parasites, including fleas, flies, lice, ticks, screw-worms and cattle grubs as well as the helminthic parasites such as lung-worm, stomach worms and gastrointestinal worms. The helminthic parasites include the strongyloids, cooperids and ascarids and are the causative agents of ascariasis, trichostrongylosis and gross parasitism. The helminths grow and mature in various organs but particularly the gastro-intestinal tract of their host. In the usual life cycle, the ova pass out of the body with the fecal droppings, hatch and reach their infective stage, whereupon they are ingested during grazing, or as in the case with hookworms, enter the body through the skin. In the case of ascarids, the swallowed eggs or larvae mature usually in the digestive tract. In other cases the maturing process may take place in other parts of the body such as the liver or the lungs as with lungworms. The parasites during maturation and growth have a very deleterious effect upon the animal and its rate of growth. In the intestine the parasites erode the epithelial tissues bringing about hemorrhage, anemia, weakness and tissue necrosis. Animals, if they do not succumb to gross parasitism are rendered economically unfit by weakness, lowered vitality, and poor growth and reproduction. It is estimated that the losses accruing to the cattle industry of the United States from gross parasitism amount to about fifty million dollars per year, with yearly losses due solely to mortality running as high as nine million dollars.

One of the undesirable parasites in animals is the cattle grub. This grub is the larval form of the heel fly (*Hypoderma lineatum*), the bomb fly (*Hypoderma bovis*) or the bot fly (*Dermatobia hominis*). The latter fly is found mostly in the Central and South American countries. The heel and bomb flies appear in the United States from February through August and fasten their eggs near the base of the hair on their host. The bot fly is not seasonal in the Central and South American habitat and lays its eggs on an insect such as a mosquito or common fly which carries the eggs to the warm-blooded host. Following their attachment, the eggs of the various flies hatch in four or five days and the larvae bore through the skin of the host. The heel fly larvae migrate to the esophageal region or the abdominal viscera while the bomb fly larvae migrate through the spinal canal. During their life in the host, the larvae feed upon host tissue. After from about three to six months, depending upon the climatic conditions, the larvae locate in the skin and particularly the skin on the back of the host. Here, the larva opens a hole through the skin, usually in the choicest part of the hide, and grows rapidly for about six weeks. The larva thereafter leaves the animal through the hole in the skin, falls to the ground and shortly thereafter, depending upon the prevailing temperature, pupates for its transformation to the adult stage. The organisms cause considerable damage to the carcass of beef animals. In infested areas, losses from beef trimmings and prime leather run as high as ten dollars a carcass. Thus, the yearly loss to the cattle industries of the United States runs into the millions of dollars.

Another undesirable parasite is the screw-worm fly (*Callitroga americana*). It can breed only in the tissues of living warm-booded animals and it must depend upon finding a wounded or diseased part of the host's body in which its young can begin development. This parasite is particularly prevalent in Southern and Southwestern States and in Central and South American countries. In the areas where it normally occurs, it is one of the greatest enemies of all the insect species with which the livestock owner must contend. Under the present system of livestock production, man-made wounds occasioned by marking, branding, shearing, castrating, dehorning, and docking afford ample and fertile breeding grounds for screwworms, as do injuries resulting from such plants as cacti and needlegrass, from fighting, from diseased tissues, and from the attacks of blood-sucking insects. Newborn animals are particularly susceptible to infestation of the navel cord.

The fly generally seeks the edges or a dry portion of the wound on which to deposit eggs. The eggs fasten tightly to the tissue surface in compact shinglelike masses. The eggs hatch in about 11 hours and the young whitish worms immediately burrow into the flesh, where they feed and grow for a period of from 4 to 7 days. The worms after attaining full growth in the wound, drop to the ground and change to pupa. After about from 7 to 60 days they emerge as flies. The injury done to the animals is inflicted by the worms or maggots. The debilitating effect and the destruction of tissue kill the infested animals in a few days. The screw-worm destroys untold numbers of domestic and wild animals and this loss costs livestock owners many millions of dollars annually.

The stable fly (*Stomoxys calcitrans*), also called the stock fly and the biting house fly, is found in all the temperate regions of the world. The adults, both male and female, are vicious bloodsuckers with long, piercing mouth parts that on penetrating the skin cause considerable pain to animals or human beings. This fly has been shown to be capable of carrying such livestock diseases as anthrax, swamp fever, and surra, as well as infantile paralysis of man. Although the stable fly is principally an annoyance to man and animals, in large outbreaks it frequently kills horses and cattle by causing them continuous worry and loss of blood. The milk production of dairy herds is lowered during every stable fly season, the decrease amounting to as much as 50 percent in seasons when the numbers of flies become large. During such seasons dairy cows and other domestic animals have been known to lose as much as 10 to 15 percent of their weight. Stable flies generally attack the lower parts of the animal body where the animal's tail is less likely to dislodge them but when flies are abundant they may attack all parts of the body. Unmolested flies usually engorge to repletion in 2 to 5 minutes. Some control of stable flies may be achieved by use of traps and sprays. Traps cannot be depended on for good control for stable flies remain on animals for only relatively short periods and therefore only those flies that happen to be on an animal will be caught. Sprays employing contact insecticides are effective only for several hours or at most a day or so, thus for good control frequent spraying is necessary. Furthermore, sprays employing contact insecticides are ineffective against parasites in all stages of growth.

The treatment of these and other parasites by presently employed methods are inadequate for obtaining good control. Some of the known materials have been of little efficacy, others impractical because of the frequency of treatment required, and still others have an adverse effect on the metabolism of the treated animal. The need for simple and inexpensive methods for the control of parasite infection is well recognized as constituting one of the major problems in animal husbandry.

It is an object of the present invention to provide a new class of chemical compounds. A further object is to provide an improved method for controlling parasites attacking warm-blooded animals. Another object is the provision of a method wherein a systemic agent is employed for the control of parasites attacking warm-blooded animals. Another object is to provide a new class of chemical compounds useful for systemic control of parasites. An additional object is the provision of novel compositions adapted to be employed in the new method for controlling parasites. Other objects will become apparent from the following specification and claims.

The new phosphoramidates represented by the structure

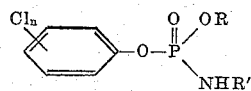

are colorless or light colored liquids or low-melting solids, soluble in many organic solvents and substantially insoluble in water. These compounds are useful for the systemic control of parasites attacking warm-blooded animals. In addition, they may be employed as constituents of insecticidal and microbicidal compositions as well as in herbicidal compositions.

Various methods may be employed in the preparation of new phosphoramidates. One procedure consists of reacting a halophenyl phosphorodichloridate having the structure

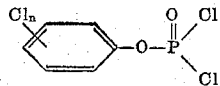

with a lower aliphatic alcohol, ROH, or alkali metal alkoxide derived from the lower aliphatic alcohol, ROM wherein M represents an alkali metal, to form an intermediate halophenyl alkyl phosphorochloridate having the structure

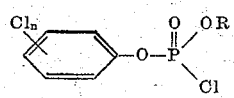

followed by reacting the latter with ammonia or a lower aliphatic amine represented by the structure, R'NH₂ to produce the desired phosphoramidate, previously defined. Good yields are obtained in preparations employing substantially equimolar proportions of halophenyl phosphorodichloridate and lower aliphatic alcohol and a molar excess of ammonia or lower aliphatic amine. The reaction may be carried out in an inert organic solvent such as methylene chloride, chlorobenzene, chloroform, benzene, ether, and carbon tetrachloride. The reaction between the halophenyl phosphorodichloridate and lower aliphatic alcohol is carried out at a temperature of from about 10° C. to 110° C. The reaction between the halophenyl alkyl phosphorochloridate and lower aliphatic amine is carried out at a temperature of from 3° to 45° C. with such rate of addition and cooling or heating as required to maintain the temperature in the desired range. The by-product in the first step of the reaction is hydrogen chloride if free alcohol is employed or alkali metal chloride if the alkoxide is employed. When the by-product is hydrogen chloride, the latter is allowed to exit from the reaction mixture as a gas. When the by-product is alkali metal chloride, it may be removed from the reaction mixture, if desired, by washing with water. The by-product in the second step is hydrogen chloride which may be removed, preferably as a hydrochloride salt of the amine or ammonia. Following completion of the reaction, the phosphoramidate is separated by conventional means.

In a representative preparation by a preferred method employing aliphatic alcohol as reactant, 1 mole of lower aliphatic alcohol in an inert solvent such as methylene chloride is added portionwise with agitation to 1 mole of halophenyl phosphorodichloridate dispersed in the same solvent, and the mixture agitated for a time sufficient to allow completion of the reaction with the formation of a halophenyl alkyl phosphorochloridate intermediate and hydrogen chloride by-product. The hydrogen chloride by-product is removed from the reaction site by agitation and by bubbling an inert gas such as nitrogen through the mixture. The remaining mixture containing a halophenyl alkyl phosphorochloridate is cooled to about 15° C. and about 2 moles of ammonia or aliphatic amine added portionwise thereto with cooling and agitation. The resulting mixture was allowed to warm to about 40°–60° C. to complete the reaction with the formation of the desired halophenyl alkyl phosphoramidate product and amine hydrochloride or ammonium chloride by-product. The reaction mixture is then washed repeatedly with water to remove the amine hydrochloride or ammonium chloride by-product, and dried with a drying agent such as calcium sulfate or sodium sulfate. The solvent is removed from the resulting solution by vaporization to recover the phosphoramidate product as residue. The latter may be purified by distillation or recrystallization.

When alkali metal alkoxide is employed instead of lower aliphatic alcohol in the first step of the above preparation, 1 mole of the metal alkoxide is added in a solution of the corresponding alcohol to 1 mole of the halophenyl phosphorodichloridate in an inert solvent such as methylene chloride or chlorobenzene, and the mixture agitated for a time sufficient to allow completion of the reaction with the formation of halophenyl alkyl phosphorochloridate intermediate and alkali metal chloride by-product. The latter may be removed, if desired, from the reaction mixture by washing with water. The halophenyl alkyl phosphorochloridate thus prepared may then be reacted with ammonia or alkyl amine as previously described.

The halophenyl phosphorodichloridate employed as starting material may be prepared by reacting 1 mole of an appropriate halophenol with about 4 moles phosphorus oxychloride in the temperature range of from about 30° to 130° C. in the presence of a catalytic amount of magnesium chloride. Following the reaction the mixture is fractionally distilled under reduced pressure to obtain the desired halophenyl phosphorodichloridate.

In an alternative method for the preparation of the phosphoramidates of the present invention, an alkali metal derivative of the appropriate halophenol having the structure

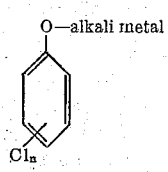

is reacted with an alkylphosphoramidic dichloride having the structure

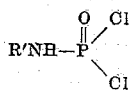

to form an intermediate halophenyl alkylphosphoramidochloridate having the structure

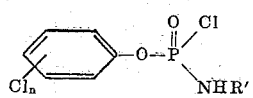

followed by the reaction of the latter with alkali metal alkoxide having the structure, RO-alkali metal, to produce the desired phosphoramidate compound previously defined. Good yields are obtained by employing substantially equimolar proportions of each of the reactants. The first step of the reaction may be carried out by adding an alcohol solution of metal halophenoxide to a solution of the alkylphosphoramidic dichloride in a neutral solvent such as methylene chloride or chlorobenzene in the temperature range of from 10° to 60° C. The reaction is exothermic and temperature control is maintained by the rate of addition of the reactants as well as by cooling. The second step of the reaction may be carried out by adding an alcohol solution of alkali metal alkoxide to a solution of halophenyl alkylphosphoramidochloridate in an inert solvent in the temperature range of from 10° to 80° C. The by-product in both steps of reaction is alkali metal chloride. The by-product alkali metal chloride may be removed from the reaction mixture, if desired, by washing with water. Following the completion of the reaction, the phosphoramidate product is separated by conventional means.

In a representative preparation, 1 mole of alkali metal halophenoxide is added portionwise with stirring to 1 mole of alkylphosphoramidic dichloride, and the mixture agitated for a time sufficient to allow completion of the reaction with the formation of halophenyl alkylphosphoramidochloridate intermediate and alkali metal chloride by-product. The resulting mixture containing the intermediate phosphoramidochloridate is cooled and 1 mole of alkali metal alkoxide added thereto with cooling and agitation. The resulting mixture is warmed to about 50° C. to complete the reaction with the formation of the desired halophenyl alkyl phosphoramidate product and sodium chloride by-product. The product is recovered from the reaction mixture by adding an inert water-immiscible solvent thereto, washing with dilute alkali and water to remove the alkali metal chloride by-product and acidic impurities, dried, and vaporized to remove the solvent and recover the desired phosphoramidate product as residue. The latter may be further purified by distillation or recrystallization.

The alkylphosphoramidic dichloride employed as starting material may be prepared by reacting the hydrochloride of an appropriate alkylamine with a molar excess of phosphorus oxychloride. Good yields are obtained by employing from 2 to 4 moles of phosphorus oxychloride per mole of amine salt. The reaction is carried out at the boiling temperature of the reaction mixture and is accompanied by the evolution of hydrogen chloride. Following the reaction, the mixture is fractionally distilled under reduced pressure to obtain the desired alkylphosphoramidic dichloride.

The following examples illustrate the invention but are not to be construed as limiting.

*Example 1.—2,4,5-trichlorophenyl ethyl ethylphosphoramidate*

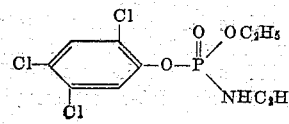

4.6 grams (0.2 mole) of sodium was dissolved in 200 milliliters of absolute ethanol to produce sodium ethoxide. One-half of the resulting sodium ethoxide (0.1 mole) solution was intimately mixed with 19.8 grams (0.1 mole) of 2,4,5-trichlorophenol to form sodium 2,4,5-trichlorophenoxide. The resulting phenoxide solution was added with stirring and cooling to 16.2 grams (0.1 mole) of ethylphosphoramidic dichloride (boiling point, 139°–143.5° C. at 22 millimeters; density of 1.36 at 23° C.). The temperature was maintained between 39° to 43° C. during the addition. After completion of the addition, stirring was continued for 5 minutes while the reaction mixture was allowed to warm to 50° C. to complete the reaction and form the intermediate 2,4,5-trichlorophenyl ethylphosphoramidochloridate. Thereafter the mixture was cooled at once to 29° C. and the remaining half of the sodium ethoxide (0.1 mole) solution above prepared added thereto portionwise with stirring while the temperature was maintained between 29° and 32° C. Thereafter, stirring was continued for 5 minutes while the mixture was allowed to warm to 41° C. to complete the reaction and to produce a 2,4,5-trichlorophenyl ethyl ethylphosphoramidate product. The alcohol solvent was vaporized from the reaction mixture containing the product and the product residue dissolved in carbon tetrachloride. The resulting solution was washed successively with dilute alkali and water and then dried over anhydrous sodium sulfate. The carbon tetrachloride was then vaporized under reduced pressure to obtain the 2,4,5-trichlorophenyl ethyl ethylphosphoramidate product as a pale orange oil which slowly crystallized to a white solid. The product in the form of a supercooled liquid had a density of 1.33 at 23° C.

*Example 2.—2,4,5-trichlorophenyl ethyl methylphosphoramidate*

A solution containing 0.17 mole of sodium ethoxide, prepared by adding 3.92 grams of sodium with 80 milliliters of absolute ethanol, was added portionwise over a period of 16 minutes with stirring and cooling to a solution of 59.3 grams of 92.5 percent 2,4-5-trichlorophenyl phosphorodichloridate (density, 1.67 at 24° C.; 0.19 mole). The mixture was maintained in the temperature range of from 12° to 22° C. during the addition. After completion of the addition, the stirring was continued for a period of 5 minutes while the temperature was kept at 22° C. to complete the reaction to produce the intermediate ethyl 2,4,5-trichlorophenyl phosphorochloridate product.

6.5 grams (0.21 mole) of methyl-amine was added over a 4 minute period to the remaining one-half of the reaction mixture above prepared and containing ethyl 2,4,5-trichlorophenyl phosphorochloridate. The mixture was maintained in the temperature range of 22° to 33° C. during the addition. After completion of the addition the mixture was stirred for an additional ten minutes to complete the reaction to obtain a 2,4,5-trichlorophenyl ethyl methylphosphoramidate product. The reaction mixture containing the product was washed with dilute aqueous alkali and water, dried over sodium sulfate and distilled under reduced pressure to remove the solvent and lower volatile impurities and to recover a purified 2,4,5-trichlorophenyl ethyl methylphosphoramidate product as a yellow oil residue. The latter had a density of 1.33 at 24° C.

*Example 3.—2,4-dichlorophenyl methyl methylphosphoramidate*

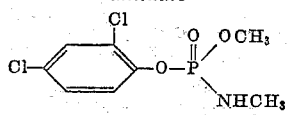

Thirty-two grams (1 mole) of methanol diluted to 125 milliliters with methylene chloride was added dropwise with stirring in the temperature range of from 20° to 30° C. to a solution of 280 grams (1 mole) of 2,4-dichlorophenyl phosphorodichloridate in 1 liter of methylene chloride. After completion of the addition, the reaction mixture was maintained in the temperature range of from 20° to 30° C. for 22 hours to complete the reaction and to produce a 2,4-dichlorophenyl methyl phosphorochloridate intermediate product and hydrogen chloride by-product. The hydrogen chloride by-product was removed from the reaction medium by mechanical agitation and by bubbling nitrogen gas through the reaction medium.

The resulting medium containing 1 mole of 2,4-dichlorophenyl methyl phosphorochloridate was cooled to 4° C. and a solution of 70 grams (2.2 moles) of methylamine in 70 milliliters of methylene chloride added thereto with stirring and cooling to maintain the reaction mixture below 15° C. After completion of the addition the reaction mixture was warmed to 28° C. and maintained at that temperature for 3 hours to complete the reaction to obtain a 2,4-dichlorophenyl methyl methylphosphoramidate product and methylamine·hydrochloride by-product. The mixture was then extracted three times with approximately 500 milliliter portions of water to remove the methylamine·hydrochloride, and the organic solution then dried with anhydrous calcium sulfate. The organic solution was heated to distill off the solvent and to recover the product as a light yellow oil. The latter was crystallized from petroleum ether (boiling range of 30°–60° C.) to obtain a purified 2,4-dichlorophenyl methyl methylphosphoramidate product as a white crystalline material melting at 54°–55° C. The product had a chlorine content of 25.99 percent and a phosphorus content of 11.59 percent. The theoretical values are 26.25 percent and 11.48 percent respectively.

*Example 4.—2,4-dichlorophenyl methyl normal-butylphosphoramidate*

A solution of 64 grams (2 moles) of methanol in 100 milliliters of methylene chloride was added portionwise with stirring to a solution of 560 grams (2 moles) of 2,4-dichlorophenyl phosphorodichloridate in 1400 milliliters of methylene chloride while the temperature was maintained below 28° C. After completion of the addition, the mixture was gradually warmed to a temperature of 41.5° C. over a period of 9 hours to complete the reaction and volatilize the hydrogen chloride by-product and to obtain a 2,4-dichlorophenyl methyl phosphorochloridate intermediate product. The methylene chloride solution of the product thus obtained weighed 2478 grams.

A solution of 73 grams (1 mole) of normal-butylamine in 150 milliliters of methylene chloride was added dropwise with stirring to a solution resulting from mixing 606 grams of the solution above prepared and containing 0.49 mole of 2,4-dichlorophenyl methyl phosphorochloridate with 50 milliliters of methylene chloride. The addition was carried out while maintaining the temperature below 11° C. over a period of about 45 minutes. After completion of the addition, the mixture was allowed to warm to a temperature of 26° C. to complete the reaction and to obtain a 2,4-dichlorophenyl methyl normal-butylphosphoramidate product and normal-butylamine·hydrochloride by-product. The reaction mixture was washed with water to remove the amine hydrochloride by-product, and then fractionally distilled to obtain a 2,4-dichlorophenyl methyl normal-butylphosphoramidate boiling from 151° to 155° C. at 0.1 to 0.2 millimeters pressure. The product has a chlorine content of 23.25 percent and a nitrogen content of 4.02 percent. The theoretical values are 22.70 percent and 4.48 percent respectively.

*Example 5.—2-chlorophenyl methyl isopropylphosphoramidate*

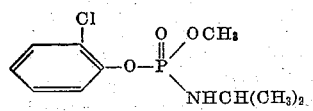

16 grams (0.5 mole) of methanol in 50 milliliters of methylene chloride was added with stirring to a solution 123 grams (0.5 mole) of 2-chlorophenyl phosphorodichloridate in 400 milliliters of methylene chloride while the temperature was maintained below 26° C. After completion of the addition, agitation was continued and nitrogen gas bubbled through the reaction mixture for 3 hours to complete the reaction to produce 2-chlorophenyl methyl phosphorochloridate intermediate and to remove hydrogen chloride by-product. The mixture was heated to a temperature of 50° C. at 2 millimeters to remove the solvent and to recover the 2-chlorophenyl methyl phosphorochloridate intermediate product.

60 grams (0.25 mole) of 2-chlorophenyl methyl phosphorochloridate, prepared as above described, was dissolved in 250 milliliters of methylene chloride, cooled to a temperature below 15° C. and a solution of 30 grams (0.25 mole) of isopropylamine in 50 milliliters of methylene chloride added thereto with cooling and stirring. After completion of the addition the mixture was gradually warmed to 23° C. over a period of 3.5 hours to complete the reaction and to obtain 2-chlorophenyl methyl isopropylphosphoramidate product and isopropylamine·hydrochloride by-product. The reaction mixture was washed with water to remove isopropylamine·hydrochloride by-product, thereafter dried over anhydrous calcium sulfate and distilled to remove the solvent and to recover the 2-chlorophenyl methyl isopropylphosphoramidate product as yellow liquid. The latter solidified on standing at room temperature for about 2 days. The solid was recrystallized from petroleum ether (boiling range 30°–60° C.) to obtain a purified product as a white crystalline solid melting at 55.5°–56° C.

*Example 6.—3,4-dichlorophenyl methyl isopropylphosphoramidate*

In a similar manner, a solution of 64 grams (2 moles) of methanol was reacted with 560 grams (2 moles) of 3,4-dichlorophenyl phosphorodichloridate to obtain 3,4-dichlorophenyl methyl phosphorodichloridate intermediate product.

A solution of 71 grams (1.2 moles) of isopropylamine in 200 milliliters of methylene chloride was added dropwise to 667 grams of a methylene chloride solution containing 0.592 mole of 3,4-dichlorophenyl methyl phosphorochloridate above prepared while the mixture was agitated and maintained at a temperature below 15° C. Thereafter, the mixture was allowed to warm to 30° C. over a period of about 3 hours to complete the reaction, then washed with water followed by heating to remove the solvent and to recover the 3,4-dichlorophenyl methyl isopropylphosphoramidate as a liquid having a chlorine content of 23.95 precent and a nitrogen content of 4.74 percent. The theoretical values are 23.80 percent and 4.80 percent respectively. The molecular weight of 3,4-dichlorophenyl methyl isopropylphosphoramidate is 298.

*Example 7.—2-chlorophenyl methyl phosphoramidate*

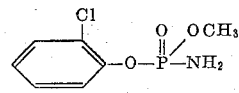

In a similar manner, 64 grams (2 moles) of methanol in 320 milliliters of methylene chloride was added portionwise with stirring to a cooled solution of 491 grams (2 moles) of 2-chlorophenyl phosphorodichloridate in 1000 milliliters of methylene chloride. Thereafter, nitrogen gas was bubbled through the mixture for a period of 30 hours while the temperature was maintained between 23° and 30° C. to obtain 2213 grams of methylene chloride solution of 2-chlorophenyl methyl phosphorochloridate intermediate product.

18 grams (1.06 moles) of anhydrous ammonia dissolved in 110 milliliters of methylene chloride was added with stirring to 553 grams of the solution above prepared and containing 0.5 mole of 2-chlorophenyl methyl phosphorochloridate while the reaction mixture was maintained below 15° C. After completion of the addition, the reaction mixture was gradually warmed to 30° C. over a period of about 3.5 hours to complete the reaction to produce a 2-chlorophenyl methyl phosphoramidate product and ammonium chloride by-product. The reaction mixture was washed several times with water and then allowed to stand in an open vessel to vaporize the methylene chloride and to recover as residue a 2-chlorophenyl methyl phosphoramidate product melting at 92°–94° C.

*Example 8.—2,4,5-trichlorophenyl methyl phosphoramidate*

In a similar manner, 128 grams (4 moles) of methanol in 200 milliliters of methylene chloride was added with cooling and stirring to 1258 grams (4 moles) of 2,4,5-trichlorophenyl phosphorodichloridate in 1500 milliliters of methylene chloride, nitrogen gas bubbled through the resulting mixture to remove the hydrogen chloride by-product and to obtain 2,4,5-trichlorophenyl methyl phosphorochloridate product. The methylene chloride solution containing 4 moles of 2,4,5-trichlorophenyl methyl phosphorochloridate weighed 4000 grams.

A solution of 18 grams (1.05 moles) of anhydrous ammonia in 150 milliliters of methylene chloride and maintained at a temperature of from −30° to −40° C. was added portionwise to 500 grams of the 2,4,5-trichlorophenylmethyl phosphorochloridate (containing 0.5 mole) solution above prepared diluted with 200 milliliters of methylene chloride. The addition was carried out at such a rate to maintain the temperature of the reaction mixture below 15° C. The mixture was then allowed to warm to 30° C. to complete the reaction and to obtain 2,4,5-trichlorophenyl methyl phosphoramidate product and ammonium chloride by-product which precipitated as a white solid in the reaction mixture. The mixture was filtered, the precipitate washed several times with water to remove the ammonium chloride by-product and to recover 2,4,5-trichlorophenyl methyl phosphoramidate product as a white crystalline solid melting at 123°–124.5° C.

*Example 9.—2,4,5-trichlorophenyl methyl methylphosphoramidate*

A solution of 33 grams (1.06 mole) of methyl-amine in 95 milliliters of methylene chloride was added dropwise with agitation to a mixture of 500 grams of a solution containing 0.5 mole of 2,4,5-trichlorophenyl methyl phosphorochloridate perpared as described in Example 8 and 200 milliliters of methlyene chloride. The reaction mixture was maintained below 15° C. during the addition. After completion of the addition the mixture was gradually warmed to 30° C. over a period of about two hours to complete the reaction to obtain a 2,4,5-trichlorophenyl methyl methylphosphoramidate product and methylamine hydrochloride by-product. During the reaction some of the by-product precipitated in the mixture as a white solid. The mixture was washed with water to remove the by-product, then distilled to remove the solvent and to recover the 2,4,5-trichlorophenyl methyl methylphosphoramidate product as a white solid residue. The latter was recrystallized from methanol to obtain a purified product melting at 98°–99° C.

*Example 10.—2,4,5-trichlorophenyl methyl tertiary-butylphosphoramidate*

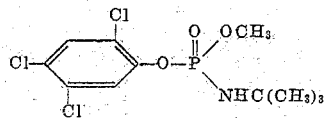

70 grams (0.96 mole) of tertiary-butylamine was added dropwise with agitation to a mixture 437 grams of a solution containing 0.437 mole of 2,4,5-trichlorophenyl methyl phosphorochloridate prepared as described in Example 8 and 250 milliliters of methylene chloride. The reaction mixture was maintained below 15° C. during the addition. After completion of the addition, the mixture was warmed to 30° C. and then allowed to stand overnight at room temperature. Thereafter it was washed with water, heated to remove the solvent and to obtain a 2,4,5-trichlorophenyl methyl tertiary-butylphosphoramidate product as a solid. The latter on recrystallization from petroleum ether melted at 91°–92° C.

*Example 11*

In a similar manner, the following compounds were prepared.

2-chlorophenyl methyl methylphosphoramidate having a melting point of 49°–51° C. by the reaction of 2-chlorophenyl phosphorodichloridate with methanol to produce the intermediate 2-chlorophenyl methyl phosphorochloridate followed by the reaction of the latter with methylamine.

2-chlorophenyl methyl ethylphosphoramidate having a molecular weight of 249.5 by the reaction of 2-chlorophenyl phosphorodichloridate with methanol to produce the intermediate 2-chlorophenyl methyl phosphorochloridate followed by the reaction of the latter with ethylamine.

3.4-dichlorophenyl methyl methylphosphoramidate having a molecular weight of 270 by the reaction of 3,4-dichlorophenyl phosphorodichloridate with methanol to produce the intermediate 3,4-dichlorophenyl methyl phosphorochloridate followed by the reaction of the latter with methylamine.

2,4-dichlorophenyl methyl isopropylphosphoramidate boiling from 138° to 145° C. at 0.5 millimeter pressure by the reaction of 2,4-dichlorophenyl phosphorodichloridate with methanol to produce phosphorochloridate followed by the reaction of the latter with isopropylamine.

4-chlorophenyl ethyl methylphosphoramidate boiling at 144°–146° C. at 0.2–0.3 millimeter pressure by the reaction of 4-chlorophenyl phosphorodichloridate with ethanol to produce the intermediate 4-chlorophenyl ethyl phosphorochloridate followed by the reaction of the latter with methylamine.

2,4,5-trichlorophenyl methyl ethylphosphoramidate melting at 67°–68° C. by the reaction of 2,4,5-trichlorophenyl phosphorodichloridate with methanol to produce the intermediate 2,4,5-trichlorophenyl methyl phosphorochloridate followed by the reaction of the latter with ethylamine.

2,4,5-trichlorophenyl methyl isopropylphosphoramidate melting at 83°–84° C. by the reaction of 2,4,5-trichlorophenyl phosphorodichloridate with methanol to produce the intermediate 2,4,5-trichlorophenyl methyl phosphorochloridate followed by the reaction of the latter with isopropylamine.

*Example 12*

251.4 grams (1 mole) of 2,4,6-trichlorophenyl phosphorodichloridate is dissolved in 500 milliliters of chloroform and the mixture heated to the boiling point and maintained under reflux. To the refluxing mixture is added dropwise 46 grams (1 mole) of ethanol over a period of about one hour. After completion of the addition, the mixture is maintained at reflux temperature for an additional hour to complete the reaction and to produce a 2,4,6-trichlorophenyl ethyl phosphorochloridate intermediate and hydrogen chloride by-product. The mixture is then cooled to room temperature and nitrogen gas passed therethrough to remove any remaining hydrogen chloride by-product.

The resulting mixture containing 2,4,6-trichlorophenyl ethyl phosphorochloridate is cooled to about 3° C. and 86 grams (2 moles) of ethylamine added dropwise thereto while the temperature is maintained below 15° C. After completion of the addition, the mixture is warmed to room temperature and maintained at that temperature for about 1 hour to complete the reaction and to obtain a 2,4,6-trichlorophenyl ethyl ethyl-phosphoramidate product and ethylamine·hydrochloride by-product as a white precipitate. The resulting mixture is washed with water several times to remove the hydrochloride by-product, heated to distill the solvent and to recover the phosphoramidate product as residue. 2,4,6-trichlorophenyl ethyl ethylphosphoramidate has a molecular weight of 332.6.

*Example 13.—2,3,4,6-tetrachlorophenyl ethyl methylphosphoramidate*

285.9 grams (1 mole) of 2,3,4,6-tetrachlorophenyl phosphorodichloridate is dissolved in 500 milliliters of chloroform and the mixture heated to the boiling point and maintained under reflux. To the refluxing mixture is added dropwise 46 grams (1 mole) of ethanol over a period of about one hour. After completion of the addition, the mixture is maintained at reflux temperature for an additional hour to complete the reaction and to produce a 2,3,4,6-tetrachlorophenyl ethyl phosphorochloridate intermediate and hydrogen chloride by-product. The mixture is then cooled to room temperature and nitrogen gas passed therethrough to remove any remaining hydrogen chloride by-product.

The resulting mixture containing 2,3,4,6-tetrachlorophenyl ethyl phosphorochloridate is cooled to about 3° C. and 62 grams (2 moles) of methyl-amine added dropwise thereto while the temperature is maintained below 15° C. After completion of the addition, the mixture is warmed to about 30° C. and maintained at that temperature for about 1 hour to complete the reaction and to obtain a 2,3,4,6-tetrachlorophenyl ethyl methylphosphoramidate product and methyl-amine·hydrochloride by-product as a white precipitate. The resulting mixture is washed with water several times to remove the hydrochloride by-product, heated to distill the solvent and to recover the phosphoramidate product as residue. 2,3,4,6-tetrachlorophenyl ethyl methylphosphoramidate has a molecular weight of 353.

*Example 14*

In a similar manner, pentachlorophenyl methyl methyl-phosphoramidate having a molecular weight of 373.4 is prepared by the reaction of pentachlorophenyl phosphorodichloridate with methanol to produce the intermediate pentachlorophenyl methyl phosphorochloridate followed by the reaction of the latter with methyl-amine.

The phosphoramidates of this invention are useful products for a variety of agricultural and industrial applications. They are, for example, useful as herbicides for the control of germination and growth of undesirable vegetation such as radish (*Raphanus sativus*) and cranberry bean (*Phaseolus vulgaris cran.*) plants. They are also useful for use as aquatic herbicides for the control of submersed and floating aquatic weeds such as Anacharis sp., *Cabomba caroliniana*, *Lysimastrum nummularia*, *Salvinia rotundifolia*, and *Ceratophyllum* sp. In a representative operation of its use as an aquatic herbicide, methyl 2,4,5-trichlorophenyl phosphoramidate was employed for the control of aquatic weed *Lysimastrum nummularia*. In such operation, substantially complete control was obtained when the aquatic weed was exposed for 2 hours to a tank containing 100 parts by weight of methyl 2,4,5-trichlorophenyl phosphoramidate per million parts of aqueous medium. Further, they are useful as parasiticides, for the control of insects, microorganisms, plant pathogens and animal parasites. In a representative use as a plant pathogen, substantially complete controls of wheat rust disease were obtained when wheat plants susceptible to wheat rust disease caused by rust fungus (*Puccinia graminis-tritici*) were sprayed in separate operations with an aqueous dispersion containing 0.25 pound of 2,4-dichlorophenyl methyl ethylphosphoramidate, 2,4-dichlorophenyl methyl butylphosphoramidate, 2-chlorophenyl methyl ethylphosphoramidate, methyl 2,4,5-trichlorophenyl methylphosphoramidate, methyl 2,4,5-trichlorophenyl ethylphosphoramidate or 3,4-dichlorophenyl methyl methylphosphoramidate in 100 gallons of spray medium and thereafter inoculated with the disease organism. As insecticides, these compounds are useful for control of insects in all stages of growth and both as contact and as systemic insecticides. Thus, the phosphoramidates of this invention give good control of Mexican bean beetle (*Epilachna varivestis*) and southern armyworm (*Prodenia eridania*) when plants such as cranberry bean plants are sprayed with compositions containing phosphoramidates and thereafter infested with the insects. The phosphoramidates also give good controls of bean aphids (*Aphis fabae*) and two spotted spider mites (*Tetranychus bimaculatus*) when infested plants are sprayed therewith. They are further useful for the control of household pests such as house fly (*Musca domestica*) and cockroach (*Americana periplaneta*).

It has also been discovered that by employing the new phosphoramidates good control of parasites attacking warm-blooded animals may be obtained and the growth characteristics of the animal may be improved. Further, the new phosphoramidates are found to be readily assimilable by warm-blooded animals and to control parasites attacking flesh, viscera or vascular system of the animals. These phosphoramidates are effective for systemically controlling parasites attacking warm-blooded animals, without adversely affecting the animals. Thus, these compounds are of low toxicity and furthermore, are effective at a concentration heretofore not thought possible. Moreover, these phosphoramidates are not bound or incorporated or otherwise retained by fat and other tissues of warm-blooded animals in the manner and extent that is the case with other phosphorus containing compounds.

The practice of this invention may be accomplished by an oral administration of phosphoramidate, by spraying the animal with a composition comprising the active compound to permit absorption thereof through the skin, or by injecting the animal with a suitable solution of the active compound. In the preferred method for carrying out this invention, the phosphoramidate compound is administered to the animal to be treated by intramuscular injection. This method of treatment permits rapid absorption of the unaltered form of the phosphoramidate and further has the advantage of being an effective means for treatment of range cattle and other grazing animals. Moreover, there is absence of sterile abscesses in their administration.

The phosphoramidates of this invention which are particularly valuable are those which have the structure

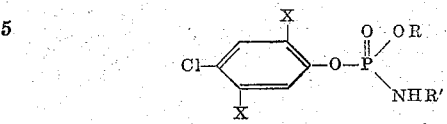

wherein R and R' is a lower alkyl radical containing from 1 to 4 carbon atoms, each X is chlorine or hydrogen, and wherein at least one X is chlorine.

In carrying out this invention a therapeutic dose or dose sufficient to control pathogenic parasites without serious toxic effects on warm-blooded animals is administered to the animal. The exact dose is dependent on the parasite to be controlled and the particular phosphoramidate compound employed, as well as upon whether the administration is to be made in a single dose or in multiple doses over a period of several days. Where a single dose is employed for the control of helminths good results are obtained when the phosphoramidates are administered at a dosage of 50 to 150 milligrams per kilogram of body weight of the animal. For the control of flies, fleas, lice and ticks, good results are obtained when the phosphoramidates are employed at dosages as low as 20 milligrams per kilogram of body weight, while for the control of screwworms and cattle grubs the phosphoramidates give good controls at dosages of 2.5 milligrams per kilogram or more of body weight. If desired, the compounds may be administered in multiple doses over a period of several days. In such operations, it is preferred to employ a daily dosage of from 0.5 to 15 milligrams per kilogram of body weight.

The process of this invention may be carried out by intramuscular injection of a solution of the phosphoramidate compound in a suitable medium. By suitable medium is meant an inert liquid carrier which will not bring about degradation of the phosphoramidate compound and further will not irritate or adversely affect the animal to be treated. Suitable liquid carriers include diethyl succinate, ethyl acetate, propylene glycol, ethyl lactate, diethyl adipate, peanut oil and sesame oil.

The systematic control by the novel compounds may also be achieved by administering the phosphoramidate to the animals orally in the unmodified form such as in gelatin capsules or pellets, or in admixture with an innocuous adjuvant such as ethanol water, skimmed milk, syrups, edible oils, or other edible carriers; surface active dispersing agents, edible powders, commercial animal feeds, concentrates and vitamin and mineral supplements. The compounds may also be administered as a spray, preferably in a non-hydrolyzing medium such as in isoparaffin oil. The latter, boiling in the range of kerosene is characterized by low odor, low phytotoxicity and lower toxicity to animals than ordinary hydrocarbon oils of the same boiling range and contain no more than traces of olefins, napthenes or aromatics and low percentage of normal paraffins. Other liquid medium normally employed for animal sprays such as kerosene and diesel fuel, as well as aqueous spray compositions wherein the phosphoramidate is dispersed with a suitable emulsifying or dispersing agent may also be employed.

The exact concentration of the phosphoramidate compounds to be employed in the compositions may vary provided that a sufficient amount be administered to provide the required dosage of the active agent. For example, where direct administration by intramuscular injection is to be employed, it is generally desirable that the injectible solution contain a fairly high concentration of the active agent. A liquid composition containing from about 35 to 55 percent of the agent is considered most practicable. Where direct oral administration to an animal is to be employed, liquid or solid compositions containing from 4 to 95 percent by weight of the phosphoramidate may be used to supply the desired dosage. Where the compounds are provided as a constituent of the principal food ration, satisfactory results are obtained with food rations containing a minor but effective amount of the phosphoramidate compounds. The exact amount of the compound to be incorporated in the ration is dependent upon the food consumption and feeding habits of the animals concerned. In animals such as pigs and mice, the required dosage may be supplied with feed compositions containing from 0.01 to 1 percent by weight of active agent. In fowl, the required dosage may be supplied with mash compositions containing from 0.01 to 0.25 percent by weight of the systemic agents. Where the compound is provided as a constituent of feed supplements, good results are obtained with supplements containing from 0.5 to 5 percent by weight of the phosphoramidate compounds. In compositions to be employed as concentrates the active agents may be present in a concentration of from 5 to 95 percent by weight.

The administration of a phosphoramidate composition by intramuscular injection constitutes the preferred embodiment of the present invention. Such compositions and method have been found to be of very low toxicity to the warm-blooded animal and to give outstanding controls of parasites.

Although the methods and compositions of the present invention and the phosphorus compounds therein employed are useful for the control of a number of parasites in warm-blooded animals, such teaching is not to be construed that the methods, compositions and compounds are equivalents for the control of a particular parasite or the life stage of such parasite, or for the control of such parasite or life stage thereof in a particular animal.

Since many of the parasites are seasonal in their appearance, the present invention is advantageously practiced with certain parasites at a particular time of the year. Thus with cattle grubs, *Hypoderma lineatum* and *bovis*, it is preferred that the administration for their control be carried out in the fall and quite soon after the disappearance of the heel and bomb flies. The disappearance of these flies varies somewhat depending upon the climate. For the control of the cattle grub, *Dermatobia hominis*, in the Central and South American countries, it is desirable that the administration be carried out about four times each year. When following such practices good controls of cattle grubs are obtained with a minimum of damage to the animal from the migration of the grub. Further, the grubs are controlled before they have a chance to adversely affect the animal or its rate of growth, or reduce the value of the animal's hide.

The control of animal parasites attacking warm-blooded animals by the administration of phosphoramidates is illustrated by the following examples:

*Example 15*

The phosphoramidate compounds represented by the structure

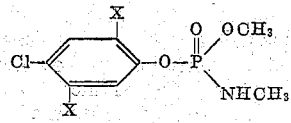

where each X is either hydrogen or chlorine and wherein at least one X is chlorine are employed as systemic agents for the control of cattle grub is yearling calves infested therewith. In such operations, each phosphoramidate compound is administered by intramuscular injection. The injectible solution is administered by injection in the hip of the animal in an amount sufficient to supply a dosage of 10 milligrams per kilogram of body weight. A group of similarly infested yearling calves is left untreated to serve as checks.

The injectible solution was prepared by dissolving the phosphoramidate compound in diethyl succinate to provide a concentration of 500 milligrams of the phosphoramidate per milliliter of solution.

At intervals of four and eight weeks following treatment the calves are examined and weighed. The examination shows that the treatments have no adverse effect on the animal or on the growth rate.

20 weeks following treatment the animals are examined for evidence of nodular dermal cysts caused by cattle grub larvae. Cattle treated with phosphoramidate compounds are found to harbor 2 or less grub larvae while untreated calves harbor an average of 10 live larvae per animal.

*Example 16*

A 119 kilogram calf heavily infested in an area of a neck wound with screwworm was injected in the hip with 1.19 milliliters of a diethyl succinate solution of 2,4-dichlorophenyl methyl methylphosphoramidate prepared as described in Example 15.

The dosage is sufficient to supply 5 milligrams of 2,4-dichlorophenyl methyl methylphosphoramidate per kilogram of body weight. Three hours following the administration, the wounds were examined and found to be substantially free of live screwworm. Twenty-four hours following administration, the wounds were found to be completely free of live screwworms.

Example 17

In a similar operation, a 166 kilogram calf was dosed at the rate of 2.5 milligrams per kilogram of body weight. 48 hours after administration, the wounds were examined and found to be substantially free of live screwworm.

Example 18

2,4-dichlorophenyl methyl methylphosphoramidate was employed as a systemic agent for the control of stable flies feeding on the skin surfaces of cattle. The composition employed and the dosing operation was as previously described with the phosphoramidate compound being administered to a 119 kilogram calf at a dosage of 10 milligrams per kilogram of body weight.

Two hours after injection, stable flies were allowed to feed on the skin of the animal for a period of 15 minutes and thereafter caged and observed for 24 hours for mortality. As a result of the treatment, a 100 percent kill of stable flies feeding on the calf dosed with 2,4-dichlorophenyl methyl methylphosphoramidate was obtained. No adverse effect on the calf attributable to the phosphoramidate compound was observed following the treatment.

Example 19

An operation was carried out in a manner similar to that described in Example 18, except that 3,4-dichlorophenyl methyl methylphosphoramidate was employed as systemic agent. An injectible composition of the phosphoramidate was administrated to a 195 kilogram calf at a dosage of 10 milligrams per kilogram of body weight, and 2 hours after injection stable flies allowed to feed on the skin of the animal as previously described. Observation of the flies which had fed on the calf treated with 3,4-dichlorophenyl methyl methylphosphoramidate showed 100 percent mortality of the flies.

Example 20

In a field test conducted in late fall soon after the heel and bot flies deposited eggs, 17 calves having an average weight of 350 pounds were taken for systemic grub control treatment. No grubs were visible on the backs of the calves at this time. Two of the calves were injected with a diethyl succinate solution of 3,4-dichlorophenyl methyl methylphosphoramidate prepared as described in Example 15, at a dosage of 10 milligrams per kilogram. The 15 remaining calves were left untreated as controls. Thereafter, the cattle were examined on the backs for development of nodular dermal cysts harboring live cattle grub larvae. After two weeks some of the calves developed nodular dermal cysts harboring grubs. Observations were made every two weeks. Grub counts made 11 weeks after the start of the treatment showed that the treated calves had an average of 2.5 grubs per head, whereas untreated calves had an average of 36.2 grubs per head.

Example 21

A sheep weighing 23 kilograms and voiding an average of about 5000 ova of gastro-intestinal nematodes per gram of feces is treated with unmodified 2,4,5-trichlorophenyl methyl methylphosphoramidate in the form of a gelatin capsule. The ova includes those of Bunostomum sp., Haemonchus sp., Oesophagostomum sp., Ostertagi sp., Trichostrongulus sp., and Cooperia sp. The amount administered corresponds to 150 milligrams per kilogram of body weight. Following the treatment, the sheep voids large numbers of nematodes. One week following treatment the feces are examined and found to be substantially free of nematode ova.

Example 22

Various phosphoramidates, 2,4,5-trichlorophenyl ethyl methylphosphoramidate, chlorophenyl methyl isopropylphosphoramidate, 2,4,5-trichlorophenyl methyl isopropylphosphoramidate and 2-chlorophenyl methyl phosphoramidate are employed as systemic agents for the control of stable flies feeding on the skin of mice. In such operations, the various phosphoramidates are directly introduced into the stomach of the mouse at a dosage of 200 milligrams per kilogram of body weight. One hour following the introduction, the mice are restrained and 10 to 15 stable flies allowed to feed on the animal for a period of one hour. The stable flies are thereafter observed for 24 hours for mortality. It is found that at the dosage of 200 milligrams per kilogram the mortality of the stable fly is over 90 percent. Stable flies fed on untreated check mice show no mortality after 24 hours.

Example 23

Six head of cattle infested with bot larvae (*Dermatobia hominis*) are injected in the hip with an injectible ethyl acetate solution of 2,4-dichlorophenyl methyl methylphosphoramidate prepared in a manner similar to that described in Example 15 at a dose of 10 milligrams per kilogram. On the third day following treatment, the efficacy of the treatment is determined by extracting all bots from the cyst and determining the percentage that have been killed. It is found that in all of the cattle thus treated substantially complete kill is obtained. Examination of the cattle five weeks after treatment shows no reinfestation with bots. During this period, no toxicity or injurious effect to the cattle is seen.

Example 24

An injectible solution of 2,4,5-trichlorophenyl ethyl methylphosphoramidate prepared as described in Example 15 is injected in the hip of a cow having a heavy infestation of short nosed cattle louse, *Haematopenus eurysternu*. At the time of injection, thousands of lice are found on the cow, and the skin along the side of the neck and brisket are denuded of hair by the parasite. The amount administered is sufficient to supply 100 milligrams of 3,4,6-trichlorophenyl ethyl methylphosphoramidate per kilogram of body weight of the cow. Examination of the skin surfaces of the cow at the end of 48 hours and 72 hours following treatment show 100 percent kill of the short nosed cattle louse. No adverse effect upon the cow attributable to the phosphoramidate compound is observed following treatment.

Example 25

Concentrate compositions are prepared containing at least one of the following phosphoramidates as active toxicant: 2,4-dichlorophenyl methyl methylphosphoramidate, 3,4-dichlorophenyl methyl methylphosphoramidate, 2,4,5-trichlorophenyl methyl methylphosphoramidate, 3,4-chlorophenyl isopropyl methylphosphoramidate and 2,4-chlorophenyl methyl isopropylphosphoramidate. The concentrate compositions are wettable powders containing 25 parts by weight of phosphoramidate compound, 44 parts of kaolin clay, 28 parts of diatomaceous earth, 2 parts of a polymerized sodium salt of a substituted benzoid alkyl sulfonic acid (Daxad Number 27) and 1 part of sodium naphthalene sulfonate (Nekal A). These ingestible concentrate compositions are prepared by mechanically mixing and grinding together the indicated constituents.

20 grams of the concentrate composition containing 5 grams of 2,4-dichlorophenyl methyl methylphosphoramidate prepared as above described is dispersed in 150 milliliters of water to obtain an aqueous drench. The aqueous drench is orally administered to yearling calves infested with cattle grub larvae. The composition is found to have been controls of the cattle grub larvae in the treated calves.

Example 26

A portion of the concentrate composition containing 2,4,5-trichlorophenyl methyl methylphosphoramidate prepared as described in Example 25 is dispersed in grain ration to produce an animal feed containing 3.3 grams of 2,4,5-trichlorophenyl methyl methylphosphoramidate per six pounds of feed. This composition is fed for a period of seven days to a yearling calf weighing 300 pounds and voiding a large number of nematode ova, in an amount sufficient to supply 25 milligrams of phosphoramidate compound per kilogram of body weight. Following treatment examination of the feces shows substantially complete reduction in number of nematode ova.

Example 27

Portions of the concentrate compositions containing 3,4-chlorophenyl isopropyl methylphosphoramidate and 2,4-chlorophenyl methyl isopropylphosphoramidate and prepared as described in Example 25 are dispersed in a commercial poultry mash to prepare feed compositions containing 0.2 percent by weight of phosphoramidate compound. These compositions are fed as a sole ration for a period of 2.5 months to two flocks of chickens. Each flock consists of ten adult chickens of same history and past environment. The compositions are fed in amounts sufficient to supply dosages of 130 milligrams of phosphoramidate compound per kilogram of body weight. A similar flock is fed unmodified mash to serve as checks. Such treatment controls blood-sucking parasites of fowls such as fleas (*Ceratophyllus gallinae*), fowl ticks (*Argas pericus*) and mites (*Dermanyssus gallinae*).

Example 28

Concentrate compositions prepared as described in Example 25 are dispersed in water to produce a spray composition containing 0.75 part by weight of the phosphoramidate compound. These compositions are adapted to be employed to supply a chemotherapeutic dose of a phosphoramidate compound. When so employed these compositions give good control of many parasites attacking animals.

We claim:

1. A phosphoramidate represented by the structure

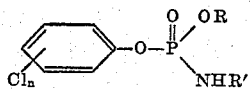

wherein R represents a lower alkyl radical containing from 1 to 4 carbon atoms, inclusive, R' is selected from the group consisting of hydrogen and a lower alkyl radical containing from 1 to 4 carbon atoms, inclusive, and n represents an integer of from 1 to 5, inclusive.

2. 2,4-dichlorophenyl methyl methylphosphoramidate.
3. 3,4-dichlorophenyl methyl methylphosphoramidate.
4. 4-chlorophenyl methyl methylphosphoramidate.
5. 2,4,5-trichlorophenyl methyl methylphosphoramidate.
6. 2-chlorophenyl methyl phosphoramidate.
7. A method for controlling parasites attacking warm-blooded animals which comprises administering to the animal a chemotherapeutic dosage of a systemic agent comprising a phosphoramidate having the formula

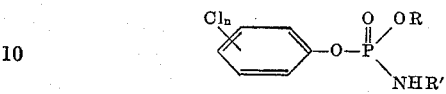

wherein R represents a lower alkyl radical containing from 1 to 4 carbon atoms, inclusive, R' represents a member of the group consisting of hydrogen and a lower alkyl radical containing from 1 to 4 carbon atoms, inclusive, and n represents an integer of from 1 to 5, inclusive.

8. In the practice of animal husbandry, the step of administering to a warm-blooded animal a systemic agent in an amount sufficient to provide from 0.5 to 150 milligrams of the systemic agent per kilogram of body weight of the animal, said systemic agent being a phosphoramidate having the formula

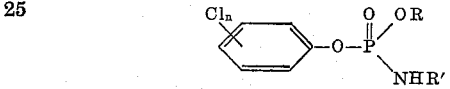

wherein R represents a lower alkyl radical containing from 1 to 4 carbon atoms, inclusive, R' represents a member of the group consisting of hydrogen and a lower alkyl radical containing from 1 to 4 carbon atoms, inclusive, and n represents an integer of from 1 to 5, inclusive.

9. A composition comprising a systemic agent, said systemic agent being a phosphoramidate having the formula

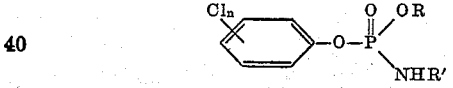

wherein R represents a lower alkyl radical containing from 1 to 4 carbon atoms, inclusive, R' represents a member of the group consisting of hydrogen and a lower alkyl radical containing from 1 to 4 carbon atoms, inclusive and n represents an integer of from 1 to 5, inclusive, and in intimate admixture therewith, an innocuous adjuvant.

References Cited in the file of this patent

UNITED STATES PATENTS

| 2,552,541 | Drake et al. | May 15, 1951 |
| 2,552,574 | Moyle et al. | May 15, 1951 |
| 2,852,469 | Hugel et al. | Sept. 16, 1958 |
| 2,855,422 | Kauer et al. | Oct. 7, 1958 |